United States Patent [19] [11] Patent Number: 4,513,533
Gething et al. [45] Date of Patent: Apr. 30, 1985

[54] METHOD AND APPARATUS FOR HYDROPONIC FARMING

[75] Inventors: Frank Gething; Edward P. Glenn, both of Tuscon, Ariz.

[73] Assignee: Kraft, Inc., Glenview, Ill.

[21] Appl. No.: 445,590

[22] Filed: Nov. 30, 1982

[51] Int. Cl.³ .............................................. A01G 31/00
[52] U.S. Cl. ......................................... 47/63; 47/65; 47/86; 47/73
[58] Field of Search ................... 47/63, 64, 65, 39, 73, 47/86; 414/416

[56] References Cited

U.S. PATENT DOCUMENTS

| | | | |
|---|---|---|---|
| 2,189,510 | 2/1940 | Swaney | 47/63 |
| 3,889,416 | 6/1975 | Bergeron et al. | 47/86 |
| 3,927,491 | 12/1975 | Farnsworth | 47/63 |
| 4,028,847 | 6/1977 | Davis et al. | 47/65 |
| 4,034,506 | 7/1977 | Kasahara et al. | 47/64 |
| 4,037,360 | 7/1977 | Farnsworth | 47/63 |
| 4,312,152 | 1/1982 | Drury et al. | 47/63 |

Primary Examiner—Robert A. Hafer
Assistant Examiner—Bradley M. Lewis
Attorney, Agent, or Firm—Fitch, Even, Tabin & Flannery

[57] ABSTRACT

Plants are hydroponically grown on rafts that float on an aqueous nutrient medium. The rafts have arrays of openings that extend from their upper surface to their lower surface for receiving plant-containing collars that dip into the aqueous medium.

To provide efficient plant thinning without plant destruction, a fraction of the openings of the array of each raft is filled directly with plant-containing collars and the remaining plant collars are placed in a grid that overlies the raft and has openings aligned with a fraction of the openings of the array.

13 Claims, 16 Drawing Figures

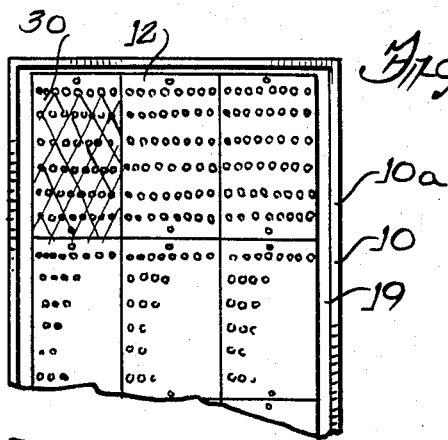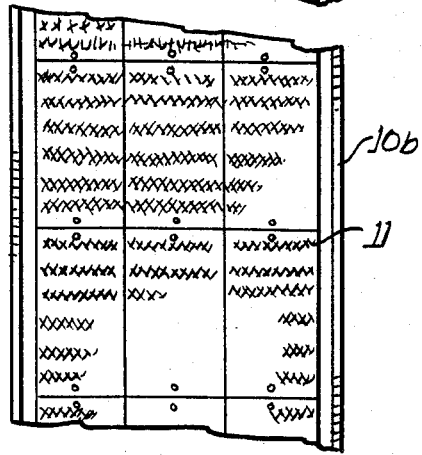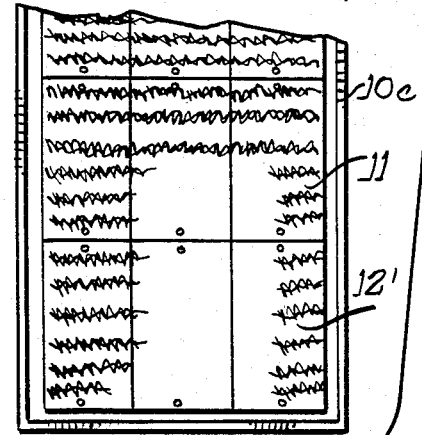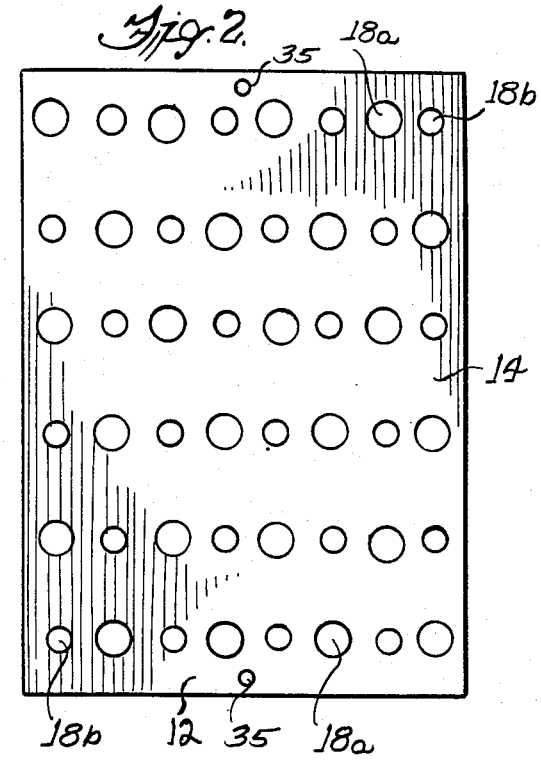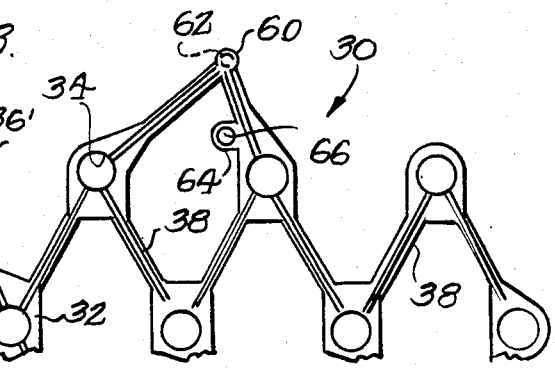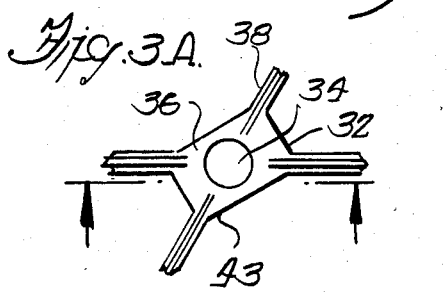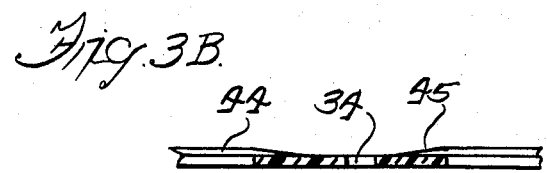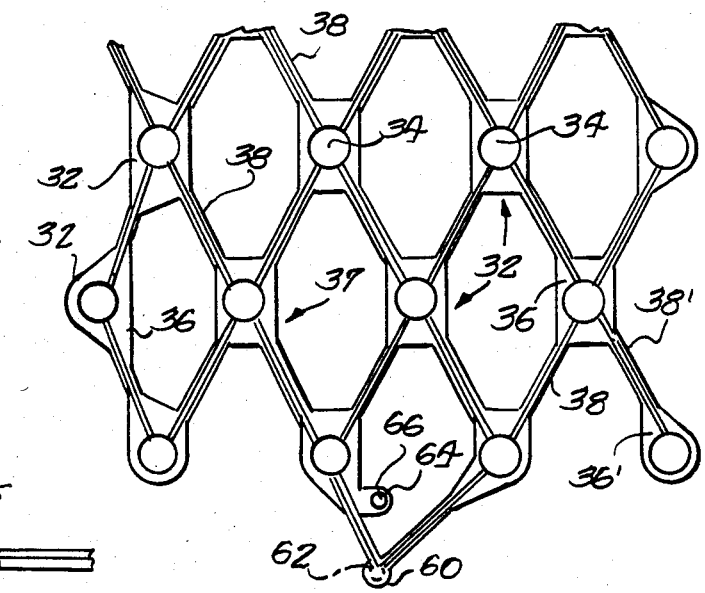

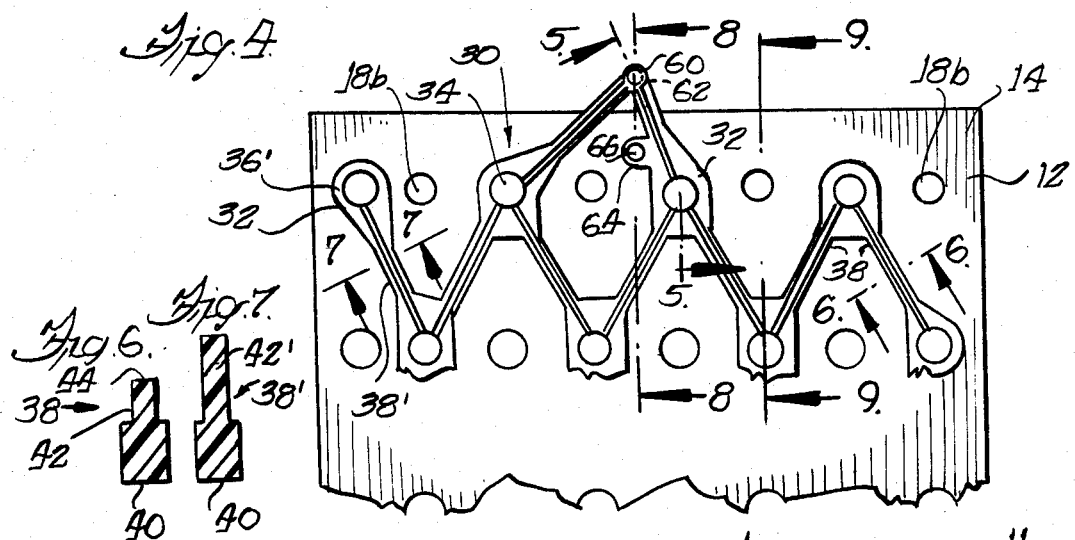
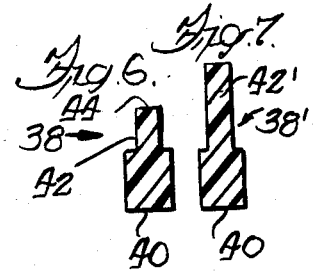
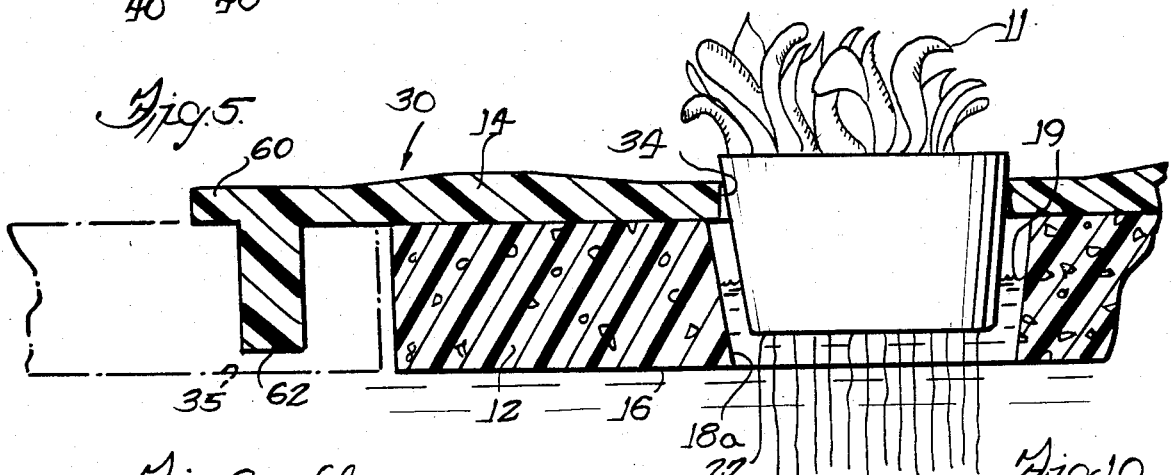
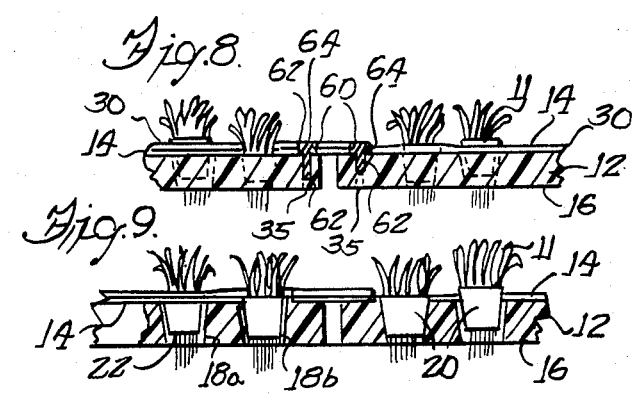
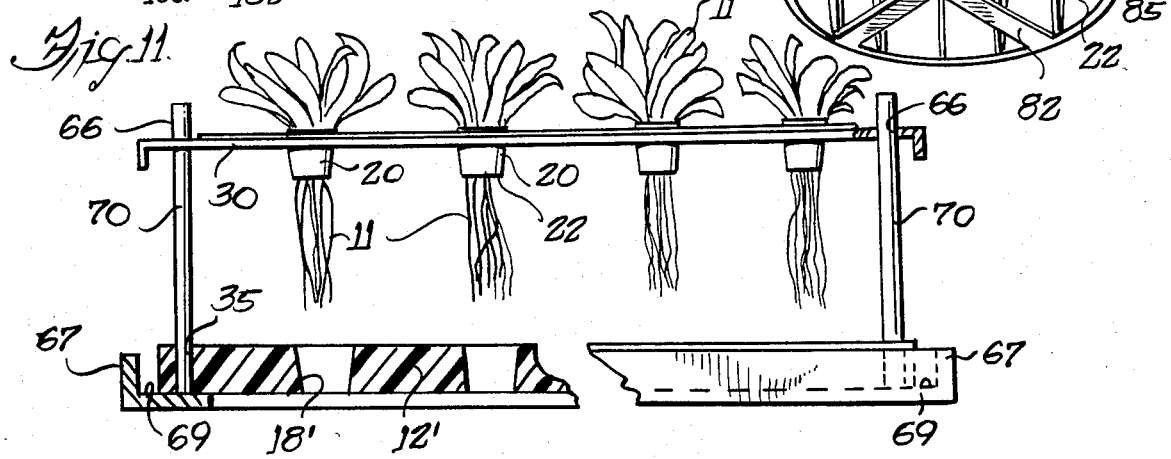

| SPACING (IN.) | n | GFW $\bar{x}$ | SD |
|---|---|---|---|
| 6.00 | 99 | 87.2 | 20.5 |
| 6.25 | 79 | 94.9 | 16.8 |
| 6.50 | 81 | 96.8 | 18.1 |
| 6.75 | 72 | 109.2 | 19.4 |
| 7.00 | 73 | 109.6 | 19.8 |
| 7.25 | 68 | 110.7 | 21.6 |
| 7.50 | 58 | 120.2 | 20.0 |
| 7.75 | 45 | 123.2 | 25.6 |
| 8.00 | 46 | 132.4 | 23.2 |
| CONTROL | 58 | 112.9 | 23.6 |

| SPACING (IN.) | n | GFW $\bar{x}$ | SD |
|---|---|---|---|
| 6.00 | 101 | 80.2 | 22.5 |
| 6.25 | 87 | 87.9 | 23.2 |
| 6.50 | 89 | 89.0 | 30.9 |
| 6.75 | 71 | 102.9 | 21.8 |
| 7.00 | 75 | 93.6 | 24.0 |
| 7.25 | 72 | 105.2 | 29.0 |
| 7.50 | 64 | 97.8 | 31.5 |
| 7.75 | 54 | 108.2 | 26.8 |
| 8.00 | 55 | 109.7 | 26.3 |
| CONTROL | 60 | 99.4 | 24.7 |

| SPACING (IN.) | n | $\bar{x}$ | SD |
|---|---|---|---|
| 6.00 | 104 | 96.8 | 13.0 |
| 6.25 | 86 | 98.3 | 14.8 |
| 6.50 | 90 | 98.6 | 16.4 |
| 6.75 | 77 | 109.2 | 17.4 |
| 7.00 | 73 | 109.5 | 17.5 |
| 7.25 | 72 | 120.1 | 17.8 |
| 7.50 | 65 | 124.7 | 14.1 |
| 7.75 | 52 | 126.1 | 19.6 |
| 8.00 | 53 | 124.1 | 22.2 |
| CONTROL | 57 | 120.3 | 16.0 |

METHOD AND APPARATUS FOR HYDROPONIC FARMING

The present invention relates to methods and apparatus for hydroponic agriculture and more particularly to methods and apparatus for floating growing plants on the surface of aqueous neutrient media.

BACKGROUND OF THE INVENTION

Considerable experimentation and development in water or hydroponic culture have brought hydroponics to the point where it is expected that hydroponic agriculture will soon represent a minor, but significant, proportion of agricultural production, particularly with respect to certain crops, such as lettuce. The advantages of hydroponics include shortening the growing period of plants from seed germination to plant maturity and the ability to move hydroponically grown plants with great ease and with substantially no damage to the root structures of the plants, whereby the plants may be rearranged to maximize the use of space during all stages of their growth cycle. Hydroponic growing systems, such as that described in U.S. Pat. No. 4,028,847, recognize that plants require more room as they grow and provide for the spreading of the growing plants so that they may be as densely grown during all stages of their growth cycle as is practical and is consistant with generally optimal growing conditions of the plant.

Shortening of the growth cycle of the plant in combination with attentent space efficiencies of hydroponics substantially increase the production per unit area, and considering that hydroponic agriculture is generally carried out in covered structures, such as greenhouses, the total yearly yield per unit area is much higher than the yield of seasonal, soil-based agriculture.

The recognized advantages of hydroponics are counterbalanced by the costs of hydroponic growing including initial capital costs, nutient costs and labor costs. A significant labor cost involves the time spent in arranging growing plants to maximize space usage while giving the plants more room as they mature.

Conventionally, plants have been grown hydroponically with the plants supported by various means on beds in which their roots are in contact with aqueous nutrient solution, such as slowly flowing streams or sprays of nutrient solution. In U.S. Pat. Nos. 3,927,491 and 4,037,360, it is asserted that certain advantages accrue by floating plants on pools of nutrient solution. As a means of floating the plants, it is proposed in the '491 and '360 patents that the plants be originally floated on individual small rafts, and after the plants have grown larger, that the plant-containing rafts be nested in individual larger rafts increasing the total buoyancy. A significant disadvantage of the system proposed in the above-mentioned '491 and '360 patents is the labor cost involved in individually nesting each individual small raft in the auxilliary larger raft as each plant matures.

Nevertheless, the concept of hydroponically growing plants by floating them in nutrient tanks has considerable advantages. Large shallow tanks may be simply constructed and provide assurance that roots of all the plants are kept moist and supplied with nutrients. The plumbing required to supply a tank system with nutrient solution is simple, and the nutrient solution for a very large number of plants can be very rapidly adjusted or replaced. A pool of water represents a significant heat sink, providing substantial thermal stability that protects the plant from extreme temperatures and sudden temperature changes. The need continues for more efficient apparatus for hydroponically growing plants on floating beds.

SUMMARY OF THE INVENTION

Plants are grown hydroponically on rafts which float on tanks filled with aqueous nutrient medium. The rafts each have an array of openings through which individually collared plants extend with their root structure in communication with the medium and their foilage extending above the raft. As a means to rapidly thin the plants of each raft, grids, each having plant holding openings which align with a fraction of the raft openings are aligned over the array. After the plants have reached a certain stage of maturity, the grids, each carrying a thinned fraction of the plants, are transferred to other rafts which carry fewer, but larger, plants.

BRIEF DESCRIPTION OF DRAWINGS

FIG. 1 is a plan view of an aqueous nutrient solution-filled raceway for a hydroponic agriculture system embodying various features of the invention, the plants within the system being supported for growth within a plurality of closely arranged rafts floating on the nutrient solution;

FIG. 2 is an enlarged plan view of one of the rafts;

FIG. 3 is a further enlarged plan view of a grid which overlies the rafts and which holds a fraction of the plants carried by the rafts;

FIG. 3a is an enlarged plan view of one of the plant holders of the grid of FIG. 3;

FIG. 3b is a cross-sectional view taken along line 3b—3b of FIG. 3a;

FIG. 4 is a fragmentary plan view of the grid of FIG. 3 overlying the raft of FIG. 2;

FIG. 5 is a cross-sectional view taken along line 5—5 of FIG. 4;

FIG. 6 is a cross-sectional view taken along line 6—6 of FIG. 4;

FIG. 7 is a cross-sectional view taken along FIG. 7—7 of FIG. 4;

FIG. 8 is a diminutive view showing coupling of a pair of rafts through the overlaid grids taken generally along line 8—8 of FIG. 4;

FIG. 9 is a view similar to FIG. 8 taken generally along line 9—9 of FIG. 4;

FIG. 10 is a greatly enlarged perspective view of a plant collar which is placed either in the grid or directly in the raft;

FIG. 11 is an elevation view, partially in cross-section, of a frame used to align the grids with the rafts;

DETAILED DESCRIPTION OF THE PREFERRED EMBODIMENTS

Figure 12A:
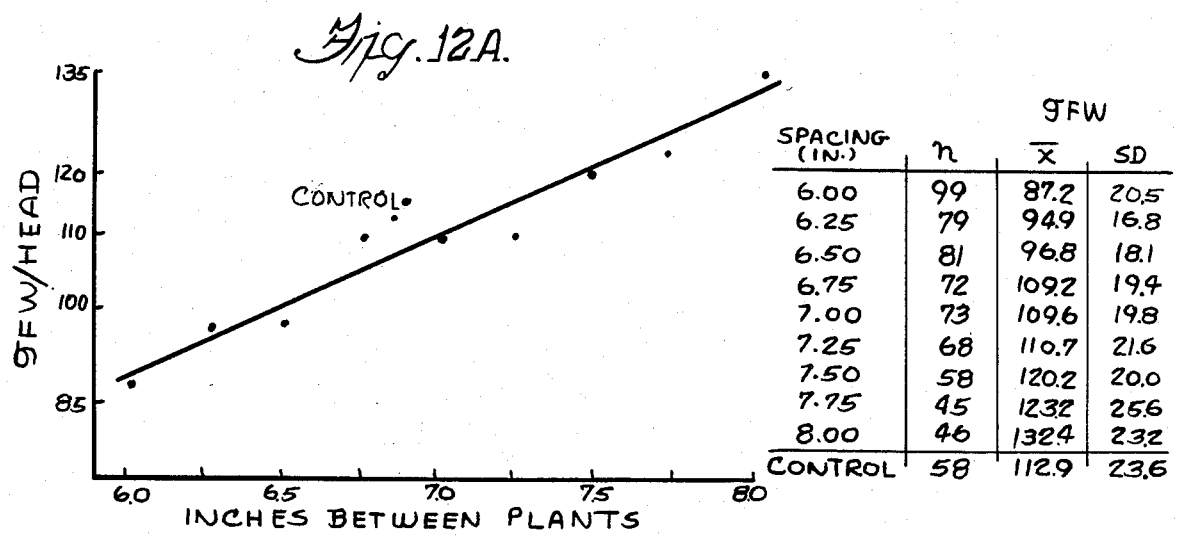
FIG. 12a is a graph illustrating results of an experiment testing the effects of different spacing of Ostinata lettuce plants, the spacing being shown on the abscissa and the head weights being shown on the ordinate, the results also being shown in tabular form.
Figure 12B:
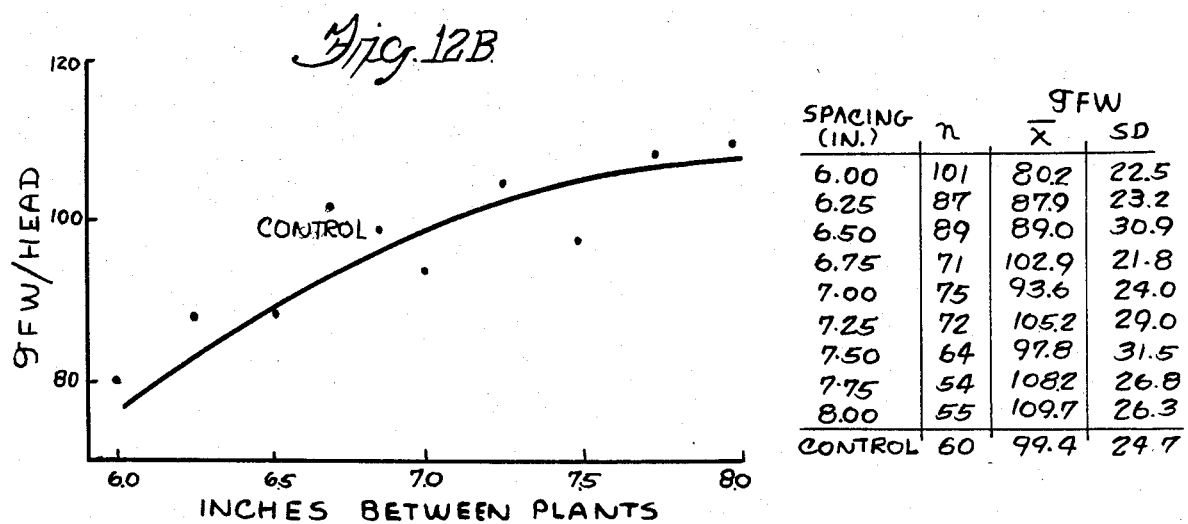
FIG. 12b is a graph and table similar to that shown in FIG. 12a but for Waldemann's Green lettuce plants.
Figure 12C:
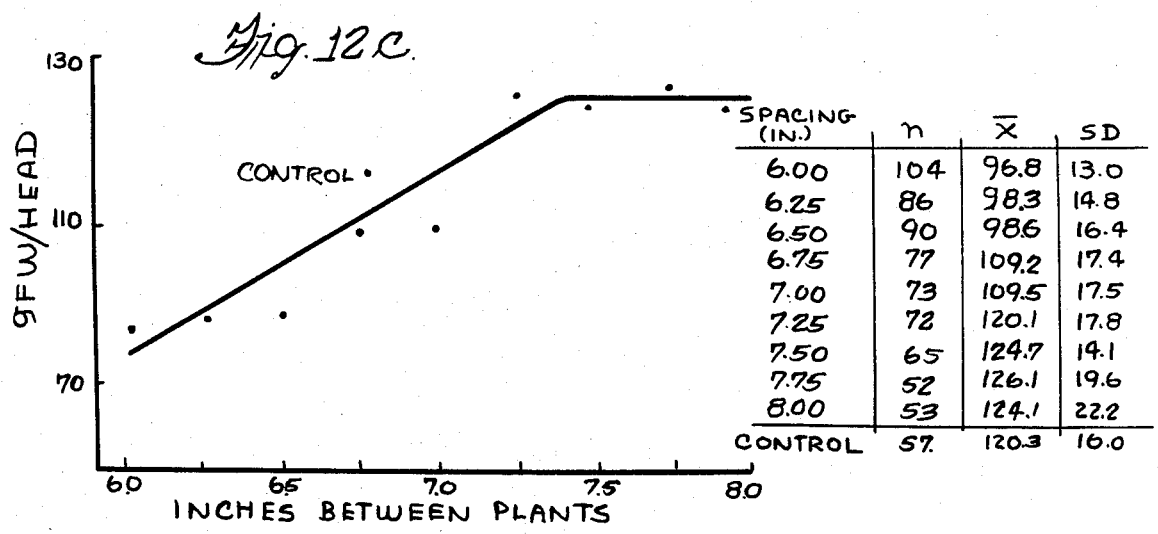
FIG. 12c is a graph and table similar to that shown in FIG. 12a but for Summer Bibb lettuce plants.

Illustrated in FIG. 1 is a tank or raceway 10 of a hydroponic agricultural system in which a plurality of rafts 12, embodying features of the invention, float on the surface of an aqueous nutrient medium. The plants 11, e.g., lettuce plants, are raised in the raceway from seedling to maturity with the rafts at an upstream area 10a of the raceway carrying seedlings, the rafts at an intermediate area 10b of the raceway carrying plants at an intermediate growth stage and the plants at a downstream area 10c of the raceway carrying more mature plants. The rafts 12 at the upstream area 10a carry a greater number of younger plants than the number of maturing plants carried by the rafts 12' at the downstream end. Thus, additional rafts 12' are required for the maturing plants, and these rafts occupy a greater percentage of the raceway space. The system provides for continuous cultivation of staggered crops, and generally each raceway 10 of the system will be filled with plants in several growth stages. As each crop of plants is harvested, the plants in their staggered stages of growth are moved downstream and thinned at least once, as hereinafter described.

Illustrated in greater detail in FIG. 2 is a raft 12 formed of a rectangular block of Styrofoam in which openings 18a,b have been cut through the raft from its upper surface 14 (FIG. 5) to its lower surface 16. The openings 18 are adapted for receiving frustoconical pots or collars 20, such as those shown in FIG. 10, with their upper ends slightly above the upper surface of the raft 12 and extending a sufficient distance into the openings 18 that their lower ends 22 dip into the aqueous medium 19 (FIG. 5). Each collar is wide enough to accomodate the base of the stem of a growing plant, such as a lettuce plant, during its entire growth cycle.

The illustrated raft (FIG. 2) has forty-eight openings in a 6×8 rectangular array. Although the openings 18 are spaced very closely adjacent to one another, generally between about 2 and about 5 inches depending on the species, sufficient room is allowed for generally optimal growth from seedlings to an intermediate growth stage, and this close spacing tends to maximize the space efficiency of the seedling-carrying raft. Larger openings 18a alternate with slightly smaller openings 18b. The smaller openings 18b have upper ends with diameters slightly shorter than the diameters of the upper ends of the plant collars 20 and the side of each, the smaller opening 18b directly supports a plant-containing collar with the upper end of the collar protruding slightly upward from the raft. The sides of the larger openings 18a (as best seen in FIG. 5) do not directly support plant-containing collars 20, the plants being supported from the sides of openings 34 (FIG. 3) in grids 30 supported on the upper surface 14 of the raft. The larger diameter of the larger openings 18a provide that the plant-containing collars may be removed from these openings without the root structure of the plant being damaged. Each raft 12 also has a pair of bores 35, one at each end of its longitudinal centerline, which have raft coupling and grid alignment functions as hereinafter described.

The preferred material for forming the rafts 12 is Styrofoam with closed cells and a high density, preferanbly 3 pounds per cubic foot or greater. Closed cell Styrofoam has very high buoyancy and generally Styrofoam rafts about one inch thick or less will float an array of densely grown plants.

The illustrated raceway 10 has a width closely matched to the width of several, e.g., three, side-by-side rafts 12 to maintain minimal lateral spacing of the rafts. The rafts are linked end-to-end by the grids 30, as described in greater detail hereinafter. Although it is not illustrated, it is preferred that the bottoms of the raceways incline, providing a shallow upstream end where the seedlings are nurtured and a deeper downstream end to provide room for the roots of the maturing plants. The inclined bottom conserves aqueous medium by providing depth not significantly in excess of that required for the plants at any stage and also facilitates draining of the raceway from the downstream end.

In accordance with an important aspect of the present invention, the grids 30 provide means for lifting together a fraction of the plant-containing collars 20 from each raft. The grid 30 is patterned so that its holders 32, consisting of flat webs 36 with circular openings 34, are laid over the alternating larger openings 18a of the raft 12. The diameters of the holder openings 34 are slightly less than the diameter of upper end diameter of the frustoconical plant collars 20 so that the collars fit into the openings 18a with major portions extending below the grid 30 into the raft openings. The collars 20 extend sufficiently downward from the holders 32 for their lower ends to dip into the aqueous nutrient medium 19.

The grids 30 consist of the holders 32 interconnected by a network of struts 38. The interior holder webs 36 are generally rectangular while the outer webs typically have curved exterior-edges. The illustrated struts 38 (FIG. 6) have T-shaped cross sections including wider bases 40 and narrower upstanding ribs 42. The upstanding ribs 42 have flat upper surfaces 44 except for end segments 45 (FIGS. 3a, 3b) which incline downward at the webs 36 blending into the upper surfaces of the webs at a certain radial distance outward of the edges of the openings 34. Corner struts 38' (FIG. 7) which individually connect corner webs 36' to the remainder of the grid structure, have ribs 42' of slightly greater height for additional rigidity.

The grid 30 is is preferably formed of a strong, relatively rigid polymeric material, such as a polyolefin or polystyrene, so that it is liftable without substantial deformation when loaded with plant-containing collars 20. The plastic grid 30 is lightweight, minimally reducing the buoyancy of the raft 12. The grid 30 might also be formed or a lightweight metal, such as aluminum.

Generally, the grid 30 will be laid over the raft 12 with its openings 34 aligned with half of the openings 18a of the raft 12, and then plant-containing collars 20 will be placed in the grid openings 34 and the small raft openings 18b. When placed in the grid 30, the plants in the collars 20 are typically at the seedling stage with an established root system and visible foilage. It would be possible for the seeds to be germinated with the collars within the openings 11 of the floating rafts 12, but generally, the collars are filled with a solid support medium, such as peat, sphagnum moss, vermiculite, etc. and planted with a seed that germinates while the collars are densely arranged in a tray (not shown) or the like.

As a means of securely interfitting the grids 30 to the raft 12 and for linking them end-to-end to each other, the grid at each end of its longitudinal centerline has a tab 60 (FIGS. 3, 4, and 5) from which a stud 62 depends for insertion into the bore 35 toward the end of the longitudinal centerline of an adjacent raft and an additional tab 64 (FIG. 3) having an opening 66 for alignment with a raft bore 35. The ends of the grids 30 extend slightly beyond the ends of the rafts 10 so that the studs 62 may be inserted into the bores 35 of the adjacent rafts. The studs 62 of the grids 30 extend through the tab openings 66 of adjacent grids and into the bores 35. A typical linking pattern for a chain of rafts is to have every other grid laid directly on the upper surface 14 of the corresponding raft and ends of the alternating grids to be laid on top of the ends of the previously laid grids. The later laid grids are thereby raised slightly from the upper surface 14 of their rafts (as can be seen on the left hand sides of FIGS. 8 and 9). The difference in level of the alternating grids is slight, typically about one-half inch, and will not prevent the lower ends of the collars 20 held therein from dipping into the aqueous nutrient medium 19.

With the lower end of the collars 20 in continuous communication with the aqueous medium 19, the plant 11 rapidly grows, its root structure growing downward into the aqueous medium and its foilage growing upward of the raft 12. At a certain point, the foilage of the seedlings becomes larger, tending to crowd each other for space and light, and thinning is required. Unlike in conventional agriculture where thinning is generally accomplished by destroying the removed plants, thinning is accomplished in this hydroponic system by separating one half of the plants 11 from the other half by individually lifting the grids 30 from the rafts 12 and placing them on other rafts 12' (FIG. 11) which are the same size but carrying only one half the number of plants. The grids 30 are individually lifted, still holding their plant collars 20', the roots sliding easily through the openings 18a without sustaining damage. Each grid 30 is then placed on a raft 12' (FIG. 11) having one half the number of openings.

Half of the plants 11 remain in the original rafts 12, and the original rafts containing plants in the smaller openings 18b will typically be alternated end-to-end with the rafts to which the grids 30 have been transferred so that the rafts may again be linked end-to-end with the studs 62 at the ends of the grids extending into the bores 35 of the longitudinally adjacent rafts. Generally, the plants 11 are thinned concurrently with harvesting mature plants and introducing seedlings into the raceway 10 so that the raceway remains filled.

At the time of thinning, the tab openings 66 and raft bores 35 also aid in aligning the raft 12' and grid 30. As the plants mature, the grid 30 becomes covered with foilage, and without guidance it would be difficult to align the grid with the openings 18' of the raft 12' to which it is transferred so that the root structure of the plants slips directly downward into the openings without damage to the root structure. A raft 12' to which a grid 30 is to be transferred is placed on a rectangular frame 67, such as that shown in FIG. 11, having an inwardly extending rectangular ledge 69 for supporting the raft by its edges and a pair of dowels 70 extending upwards at opposite ends, the spacing of the dowels being equal to the spacing between the bores 35 of each raft so that the dowels extend through the bores. With the grid 30 raised high above the surface of the raft 12', the tab openings 66 are aligned over the upper ends of the dowels, and the grid is lowered along the dowels, thereby assuring that the roots and then the collars 20 will lower directly into the raft openings 18. After the rafts 12 are linked end-to-end, the dowels are removed and the raft 12' lifted from the frame and transferred back to the raceway.

After the grids 30 have been lifted from the rafts 12, the larger openings 18a contain no plants. Frustoconical plugs may be inserted into the vacant openings to prevent algae growth; however, this is generally not considered necessary.

Illustrated in FIG. 10 is a collar 20 that is advantageously used with the plant floatation system of the present invention. The collar 20 consists of a frustoconical sidewall 80 formed of a polymeric material and cross-struts 82 extending across its substantially open lower end 22. The substantially open lower end provides for unhindered root growth therethrough. The cross-struts 80 hold the plant and a solid growth media within the collar 20. Cross-struts 80 will support material such mesh-wrapped peat pellet. However, the cross-struts 80 will also support a plant in loose solid support material, such as loose peat, sphagnum moss or vermiculite, if the root structure of the seedling is allowed to develop sufficiently before the collar 20 is transferred from the seed germination tray to the raft. Vertical fins 85 along the interior of the sidewall 80 prevent the roots from growing in a circle along the sidewall, which growth pattern is found to retard later development.

The plastic collars 20 are very inexpensively formed, e.g., by injection molding. They are sufficiently durable to remain intact throughout the entire growth cycle of the plant. It is intended that the plant will be marketed in these collars as a still-living plant with its root structure still intact assuring freshness of the marketed plant.

EXAMPLE 1

The following experiment evaluated the effect of transplanting plants form one floating raft to another:

Bibb lettuce plants were germinated in peat pellets within collars, such as described above. After two weeks, the seedlings were placed in two side-by-side rafts, each having twenty-four plants and each having 4"×4" spacing. After another two weeks (4 weeks total), the plants in one tray were transplanted into an identical raft (no change in spacing). The lettuce was harvested and the heads weighed and checked for quality at the end of 6 weeks. Quality on a scale from 1 to 9 is based upon appearance with bolting of the heads being the most significant undesirable quality. The results are as follows:

|  | Fresh Weights of Lettuce Heads | | |
| --- | --- | --- | --- |
|  | x̄ | σ | Quality |
| 6 wks, with transplant at 4 wks | 123.3 | 17.6 | 5.2 |
| 6 wks, no transplant | 126.1 | 21.7 | 5.0 |

This experiment shows that transplanting alone from one raft to another has no significant effect on the final product, indicating that the root structure is not damaged as the plants are transplanted.

EXAMPLE 2

Experiments were conducted to determine the effect on spacing on the head size of three types of lettuce; Ostinata, Waldmann's Green and Summer Bibb. Styrofoam boards 8 feet by 4 feet and one inch thick were provided with openings for plant collars that were staggered so that each plant was equally spaced from six other plants. Boards with different spacings were used, spacing ranging from 6" to 8". The collared seedlings were placed in the rafts at two weeks of growth and harvested at the end of 6 weeks. Only those heads which were surrounded by other plants on six sides were weighed and examined. Each run was accompanied by a control group in which plants were arranged in a square pattern with 6.8"×6.8" spacing. The results are graphically summarized in the graphs of FIGS. 12a (Ostinata), 12b (Waldmann's Green) and 12c (Summar Bibb), and the accompanying tables showing spacing, number of heads, mean weights (in grams) and standard deviation.

The results show that the size of the heads is quite sensitive to spacing up to a certain point, but that further increased spacing does not substantially affect the size of the head. In the case of Ostinata lettuce, it appears that spacing beyond the tested range might further increase the size of the heads. It is very important to determine the relationship of spacing to size for each type of plant because using excess spacing between plants dramatically reduces the efficiency of the hydroponic operation. The 8'×4' raft with 6 inch spacing allowed for 135 openings whereas the 8'×4' raft with 8 inch spacing allowed for only 77 openings. In the case of each type of lettuce, the smaller spacing yielded the greatest total weight in spite of decreased head size; however, marketing considerations may indicate greater spacing to achieve larger head growth. There is no reason, however, for spacing the plants beyond the point where increased head size is generally unaffected by increased spacing.

Several advantages of the invention may now be more fully appreciated. The invention provides a method for maximizing the use of space in a hydroponic facility and maintaining the plants in generally maximum density consistent with optimal growth conditions. The grids, by which fractions of plants can be lifted from one raft to another, provide for instantaneous plant thinning without destruction of plants and require significantly less labor than previously-described systems where individual growing plants would have to be relocated to larger floatation systems or hydroponic beds. Although, it is presently contemplated that the grids will be lifted from raft to raft manually, the grids are readily adaptable to automated procedures where mechanical means would be used to lift the grids from raft to raft. The final product of the system is mature plants, each within an inexpensive, disposable collar. The plants may be marketed as fresh, mature living plants.

While the invention has been described in terms of certain preferred embodiments, modifications obvious to one with ordinary skill in the art may be made without the departing from the scope of the present invention. For example, the invention has been described primarily with reference to rafts and grids in which the plant-containing collars are originally arranged in rectangular arrays because this represents the embodiment which the inventors have most fully developed. However, the inventors recognize that better spacing can be obtained with other array configurations, such as the staggered configuration described in Example 2, and other arrays are being tested in efforts to balance space maximization in both the pre-transplanted and post-transplanted rafts. Overlapping grids could be used to transplant fractions other than one half of the plants. A nested grid arrangement might be used if it is found that for certain plants multiple transplantations are desirable during their growth cycle.

Various features of the invention are set forth in the following claims.

What is claimed is:

1. A system for the hydroponic growth of plants within at least one tank containing aqueous nutrient medium, the system comprising a generally flat raft having an upper face and a lower face and sufficient buoyancy to float while supporting a plurality of plants, said raft having a substantially regular array of openings extending between said upper face and said lower face, grid means having a plurality of interconnected holders which align with a regular pattern of said openings distributed substantially evenly among said array when said grid is laid over said upper face without obstructing access to the remaining openings, and a plurality of plant collars adapted to be held either directly in said openings or by said holders extending into said raft openings when said grid means is laid on said upper face, whereby said plants held in said grid means may be simultaneously removed from said raft.

2. Apparatus according to claim 1, wherein said raft is formed of high density, closed cell Styrofoam.

3. Apparatus according to claim 2 wherein said Styrofoam has a density of at least three pounds per cubic foot.

4. A system according to claim 1 wherein said grid means is a single grid and the holders of said grid on said upper face align with approximately one half of said openings.

5. A system according to claim 1, said grid means having means for linking adjacent grid means.

6. A system according to claim 1 including means for lowering said grid means onto said raft in vertical alignment therewith.

7. A system according to claim 1 wherein said tank is an elongated raceway along which rafts are floated downstream as they mature.

8. A system according to claim 7 wherein the bottom of said tank slopes downward in the downstream direction.

9. A method of growing plants comprising
   providing a tank filled with aqueous nutrient medium,
   floating a plurality of rafts within said tank, each raft having an upper face and a lower face and a plurality of openings in a substantially regular array extending between said upper face and said lower face,
   placing said grid means on each of said rafts, each grid means having holders alignable with a regular pattern of said openings distributed substantially evenly among said array of said openings in each of said rafts,
   inserting plant-containing collars in said opening-aligned holders and in the remaining raft openings, said collars each having a lower end with substantial open area that extends to said aqueous medium when said collars are received in said openings, and
   upon said plants reaching a certain stage of maturity, transferring said grid means-held collars to other rafts to reduce plant density.

10. A method according to claim 9 wherein said grid means is a single grid and the holders of said grid on said upper face align with approximately one half of said openings.

11. A method according to claim 9 wherein means are provided for lowering said grid means onto said raft in vertical alignment therewith.

12. A method according to claim 9 wherein said tank is an elongated raceway along which rafts are floated downstream as they mature.

13. A method according to claim 12 wherein the bottom of said tank slopes downward in the downstream direction.

* * * * *